Figure 1:
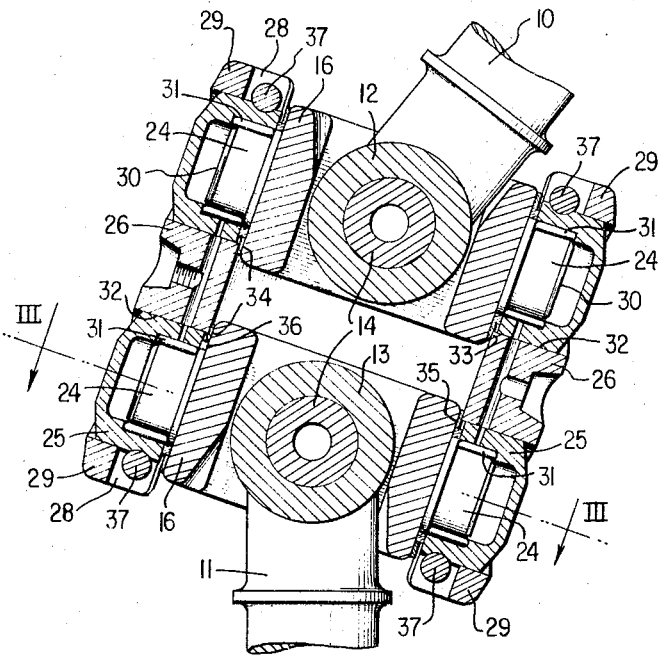

May 16, 1967 W. HOPF ETAL 3,319,439
UNIVERSAL JOINT

Filed May 12, 1965 2 Sheets-Sheet 1

INVENTORS.
WILHEM HOPF
ALBERT KÄRCHER

BY *Dicke + Craig*

ATTORNEYS.

May 16, 1967  W. HOPF ETAL  3,319,439
UNIVERSAL JOINT
Filed May 12, 1965  2 Sheets-Sheet 2

INVENTORS.
WILHELM HOPF
ALBERT KÄRCHER

BY Dicke & Craig

ATTORNEYS.

United States Patent Office 3,319,439
Patented May 16, 1967

3,319,439
UNIVERSAL JOINT
Wilhelm Hopf, Stuttgart, and Albert Kärcher, Stuttgart-Munster, Germany, assignors to Daimler-Benz Aktiengesellschaft, Stuttgart-Unterturkheim, Germany
Filed May 12, 1965, Ser. No. 455,131
Claims priority, application Germany, May 14, 1964, D 44,432
10 Claims. (Cl. 64—17)

The present invention relates to a double Cardan or universal joint, especially for motor vehicles, in which two shafts engage with the mutually facing fist-like ends thereof in bolts extending perpendicularly to the shafts axes and in which each bolt is rotatably supported on both sides of the fist-like shaft ends in a universal joint cross, whereby both universal joint crosses are rotatably retained, in their turn, in a common entrainment ring or carrier plate arranged between the same by means of two bearing pins each, which are displaced by 90° with respect to the bolt bearings.

With the known joints of the aforementioned type, there always exists the desire for as small as possible a joint diameter and distance between the universal joint crosses with a given torque and deflection angle. It has already been proposed heretofore in another application assigned to the assignee of the present application to provide for that purpose a joint, in which the bearing bolt in the universal joint crosses is secured by a central clamping stud or bolt. In this and other known joints of the same type, the eyes or bosses for receiving the bearing pins of the joint crosses are formed by separate small bearing blocks screwed onto the entrainment ring or carrier plate. It has now been discovered that this arrangement and the assembled small bearing blocks not only cannot satisfy the requirements described hereinabove but that especially the small bearing blocks give rise to objections from a rigidity point of view.

The present invention aims at the elimination of the aforementioned difficulties and solves the underlying problems with the joints of the type mentioned above in that the carrier plate or entrainment ring forms simultaneously in one piece the eyes or bosses for receiving the bearing pins at the two universal joint crosses and that these eyes or bosses are slotted for the insertion of the universal joint crosses in a plane containing the shaft axis.

It is already known in the prior art to make the entrainment ring or carrier plate and eyes or bosses in one piece, whereby, inter alia, there results the advantage that the bearing bores can be made in exact alignment during one working operation or during one and the same chucking. The known joints—which included these measures—had, however, a completely different basic construction, that is, with these known joints the shaft ends are of fork-like construction. The joint cross had to be inserted in these known joints obliquely into the bores of the entrainment bosses. The eyes or bosses, therefore, cannot be placed radially more closely to one another with these prior art joints than is permitted considering the "threading" or assembly.

In one embodiment according to the present invention, the slot extends through the entire depth of the bosses or eyes and is therefore only slightly wider than the diameter of the bearing pins at the universal joint crosses. The latter arrangement is also maintained with the preferred construction in accordance with the present invention which additionally proposes that a web remains at the eyes or bosses outside the slot and bridging the latter and that the interior width between two oppositely disposed webs belonging to the same universal joint cross is only slightly larger than the distance between the end faces of the bearing pins at this joint cross.

The construction in accordance with the present invention offers the advantage that the radial and axial dimensions of the joint only have to be guided by considerations of rigidity or the desired joint deflection. No consideration need thereby be given any longer to the assembly for the universal joint crosses are inserted into the slots in the shaft direction and the bearing bushings are inserted radially. The advantage of the known joints as regards the aligned bearing bores is thereby retained completely with the construction of the present invention.

The bearings bushings for the pins of the universal joint cross are—as already mentioned—inserted radially. A screw or bolt extending through the slot serves in accordance with the present invention for the fixing and fastening of the bearing bushings in the circumferential and radial directions, which bolt may possibly also receive simultaneously a cover closing off the slot. The joint diameter is also reduced by this measure as no space is any longer needed for the radial fastening and securing.

The present invention may be further developed in that both universal joint crosses may be fitted force-lockingly into the aperture of the entrainment ring or carrier plate possibly with the aid of separate abutment surfaces and thrust washers. It is proposed in accordance with the present invention in the same manner that each shaft fist is force-lockingly inserted into the apertures of the co-ordinated universal joint cross possibly with the aid of separate abutment surfaces and thrust washers.

These measures are directly related to the main concept of the present invention and have as a consequence that the reduction of the joint diameter, aimed at by the present invention, may only be realized to the full extent thereby. For they have as a result that the bearing bushings for the pins of the universal joint crosses no longer have to absorb any radial forces, and therefore, as a result thereof, need no longer be secured against such forces. The same is also true for the bearing support of the bolt within the universal joint cross. Since the radial securing means are obviated or can be constructed considerably less sturdy, no separate space has to be provided any longer for the same. Consequently, with the same outside diameter, the torque to be transmitted can be increased, or vice versa, with the same torque the outer diameter may be reduced. Therebeyond these measures offer the further advantage that the universal joint cross can no longer be stressed and that no radial forces are transmitted any longer by way of the pressed-in bolts in the shaft fists. In that connection it should also be mentioned that the term "radial" is used herein with reference always to the shaft axis.

Moreover, the present invention further proposes that the two universal joint crosses are bevelled off at the mutually facing surfaces thereof in the direction toward the bolt bearings. As a result thereof, the shaft fists can be moved more closely to each other. Also, this measure is interrelated with the construction proposed hereinabove, for it could hardly be used, for example, with the central and force-absorbing securing means according to the aforementioned prior construction proposed heretofore.

Accordingly, it is an object of the present invention to provide a double Cardan joint, especially for motor vehicles, which eliminates by simple means the aforementioned drawbacks and shortcomings encountered with the prior art constructions.

Another object of the present invention resides in the provision of a double Cardan joint of the type described above which permits a small joint diameter and relatively small spacing between the two universal joints without sacrifice in torque transmitting capacity or the angular deflection capability of the universal joint.

A further object of the present invention resides in the provision of a double Cardan joint which achieves the aforementioned objects and characteristics in a completely satisfactory manner as regards reliability in operation and rigidity of the various parts under all operating conditions.

Still another object of the present invention resides in the provision of a double Cardan joint, especially for motor vehicles which is simple in construction and easy to assemble and disassemble, yet is of relatively smaller overall dimension than relizable heretofore with a given torque transmission and deflection angle between the two joints.

A still further object of the present invention resides in the provision of a double universal joint which permits a reduction of the joint diameter while at the same time relieving the bearing pins of radial forces, thereby resulting in a further simplified construction.

Another object of the present invention resides in the provision of a double Cardan joint for motor vehicles which not only permits an increase in the torque to be transmitted with identical external diameter or a reduction of the external diameter with the same torque transmission but at the same time prevents in a far-reaching manner the occurrence of stresses with the universal joints as was frequently the case with the prior art constructions.

Figure 2:
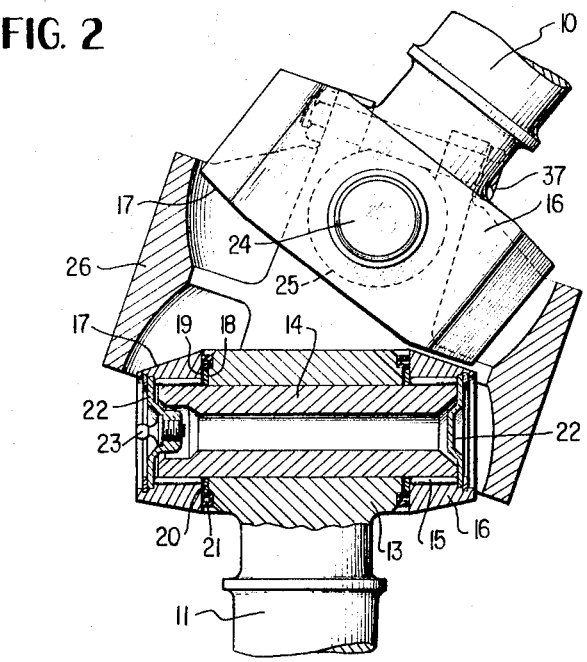
Figure 3:
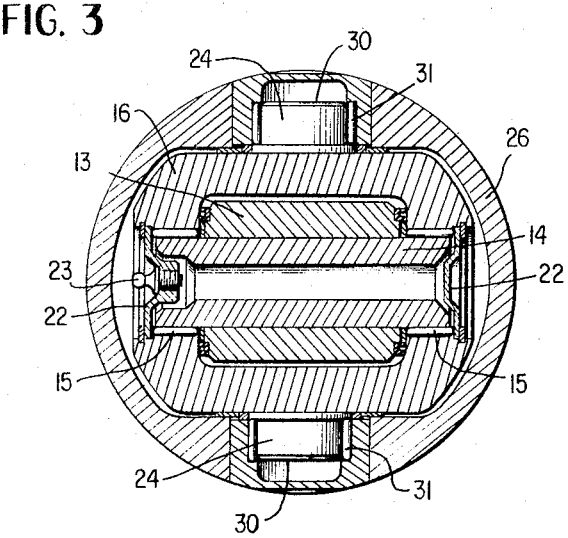
Figure 4:
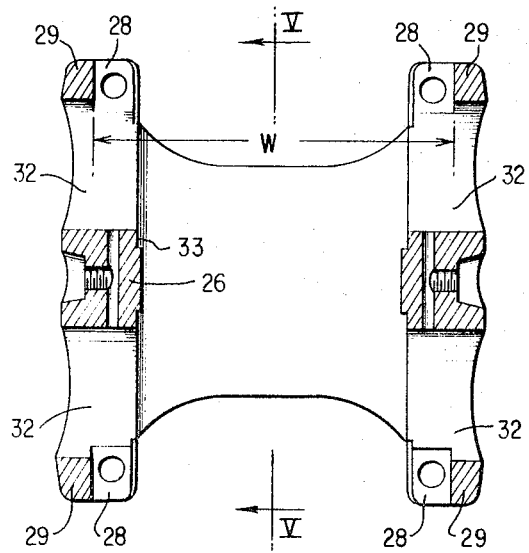
Figure 5:
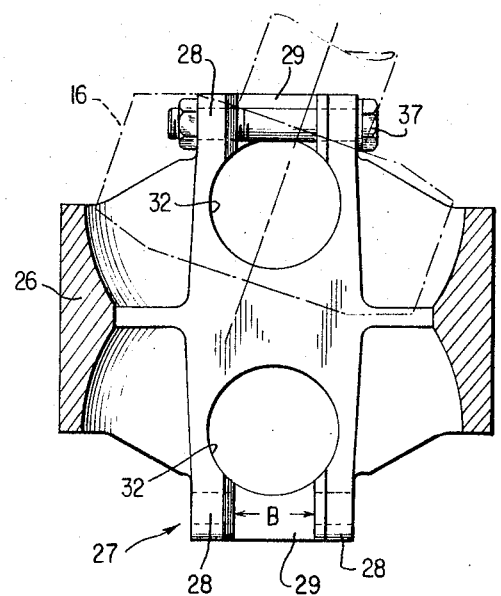

These and further objects, features and advantages of the present invention will become more obvious from the following description when taken in connection with the accompanying drawings, which show, for purposes of illustration only, one embodiment in accordance with the present invention, and wherein FIGURE 1 is a cross-sectional view through the double universal joint in accordance with the present invention with the two shafts at an angle with respect to each other, i.e., with a bent joint, FIGURE 2 is a cross-sectional view through the joint of FIGURE 1, taken at right angle to the cross-sectional view of FIGURE 1, FIGURE 3 is a cross-sectional view through the universal joint of FIGS. 1 and 2 taken along line III—III of FIGURE 1, with the joint straightened out, FIGURE 4 is an axial cross-sectional view through the entrainment ring in accordance with the present invention, and FIGURE 5 is a cross-sectional view through the entrainment ring of FIGURE 4, taken along line V—V of FIGURE 4.

Referring now to the drawing, wherein like reference numerals are used throughout the various views to designate like parts, and more particularly to FIGURES 1 to 3, the shafts 10 and 11 illustrated in these figures are constructed in a fist-like manner at the mutually facing ends thereof. Bolts 14 are pressed into the shaft fists 12 and 13. Since the construction of each shaft end is identical, only one side will be described in detail hereinafter. Each bolt 14 is supported with its end by way of needle bearings 15 or similar roller bearings in a universal joint cross member 16. The universal joint cross member 16 is provided at the end surfaces facing the other universal joint cross member 16 with inclined surfaces 17 (FIG. 2) in order to achieve a larger bending angle of the joint. The mutually opposite end faces 18 and 19 provided at a respective shaft fist and cross member 16 serve for the force transmission between the shaft fist 12 and the universal joint cross member 16, whereby thrust washers 20 are arranged between the end surfaces 18 and 19. Seals 21 prevent a pressing-out of the lubricant out of the bearings 15. The bearings 15 are closed off against the outside by covers 22 which are sealingly inserted into the universal joint cross member 16 without, however, having to transmit forces in the radial direction. One of the two covers 22 is provided with a lubricating nipple 23.

The universal joint cross members 16 are provided with bearing pins 24 which are displaced by 90° with respect to the bolts 14. The cross members 16 are supported by means of the bearing pins 24 with the aid of separate bearing bushings 25 in a common entrainment ring or carrier plate 26 which is shown in detail in FIGURES 4 and 5. The entrainment ring 26 forms itself at the same time in one piece, the eyes or bosses generally designated by reference numeral 27 for receiving the aforementioned bearing bushings 25. These eyes or bosses 27 have, as shown in FIGURES 4 and 5, slots 28 at the sides thereof facing the shafts 10 and 11 which slots 28 are bridged by webs 29. The webs 29 considerably contribute to the reinforcement of the entire entrainment ring 26.

In order to permit the insertion of the universal joint cross members 16 together with the bearing pins 24 thereof into the entrainment ring in the direction of the shafts, the width B of the slots 28 (FIG. 5) is slightly larger than the diameter of the bearing pins 24 at the universal joint cross members 16. Furthermore, the interior width W (FIG. 4) between two webs 29 is slightly larger than the distance between two end faces 30 of the bearing pins 24 at the universal joint cross members 16. It is possible in this manner to insert or slide the shafts 10, 11 together with the two fully assembled universal joint cross members into the entrainment ring 26 in the direction of the shaft axis. The bearing bushings 25, inclusive the needle or other roller bearings 31, are then placed on the pins 24 radially from the outside. The bores 32 for receiving the bearing bushings 25 are bored or machined into the entrainment ring 26 during the same chucking or machining operation. The mutually opposite end surfaces 33 and 34 at the entrainment ring 26 and at the universal joint cross members 16, respectively, serve for the force transmission between the cross members 16 and the entrainment ring 26, whereby thrust washers 35 are interposed. Also in this case, seals 36 are provided which prevent a leakage of the lubricant or grease out of the bearing bushings 25.

The securing of the bearing bushings 25 against rotation and at the same time in the radial direction takes place by screws or threaded bolts 37 which bridge the slot 28 and slightly engage in the bushings 25 as shown in FIGURE 1. The bolts 37 are appropriately pre-stressed. As a result thereof, they can additionally counter the forces which aim at elastically enlarging the bores in the eyes or bosses. Thus, they reinforce the webs 29 in addition to their function as secruing means. These bolts 37—if according to another modified construction of the present invention, the slot 28 extends clear through the bosses over the full depth thereof so that no web 29 remains—can further receive separate covers or intermediate pieces bridging the slot.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A double universal joint, especially for motor vehicles, comprising: two drive shafts, each having a bearing end portion; two cross members; first means for mounting each of said shaft end bearing portions to a corresponding one of said cross members for relative pivoting about a first axis generally at right angles to the respective shaft axis; a carrier ring; second means for mounting each of said cross members to said carrier ring for relative pivoting about a second axis generally at right angles to the respective shaft axis and said first axis; said second means comprising for each of said cross members oppositely disposed bearing pins on each of said cross members, a pair of bores extending completely through said ring aligned with and symmetrical with respect to said second axis, each of said bores having a slot in the plane that generally includes said drive shafts and opening outside of said ring in the direction perpendicular to said second axis, said slots being generally channel shaped and each formed by side walls and an end wall, the dimension between said side walls being slightly larger than the diameter of said bearing pins, means radially installable including a bushing for each of said bores having an outer diameter substantially equal to the diameter of the corresponding bore and an inner diameter substantially equal to the diameter of said bearing pins for pivotally mounting bearing pins in said bores, said ring having a continuous wall around each of said bores with a web portion on the outside and adjacent to and spanning said slot to form said end wall, bolt means extending across each of said slots from one side wall to the opposite side wall for preventing rotation of the corresponding bushing about and movement of the corresponding bushing along said second axis.

2. The device of claim 1, each of said bolt means being under tension between said side walls.

3. The device of claim 2, said cross member having outwardly facing annular shoulder surfaces adjacent to the inner end of each of said bearing pins and said ring having mating annular shoulder surfaces constituting means for preventing relative movement and absorbing thrust along said second axis.

4. The device of claim 3, said cross member having additional outwardly facing annular shoulder surfaces and said drive shaft bearing end portion having mating annular shoulder surfaces constituting means for preventing relative movement and absorbing thrust along said first axis.

5. The device of claim 4, separate thrust plates mounted between each of said mating annular surfaces.

6. The device of claim 1, said cross member having outwardly facing annular shoulder surfaces adjacent to the inner end of each of said bearing pins and said ring having mating annular shoulder surfaces constituting means for preventing relative movement and absorbing thrust along said second axis.

7. The device of claim 6, said cross member having additional outwardly facing annular shoulder surfaces and said drive shaft bearing end portion having mating annular shoulder surfaces constituting means for preventing relative movement and absorbing thrust along said first axis.

8. The device of claim 7, separate thrust plates mounted between each of said mating annular surfaces.

9. The device of claim 1, said cross member having additional outwardly facing annular shoulder surfaces and said drive shaft bearing end portion having mating annular shoulder surfaces constituting means for preventing relative movement and absorbing thrust along said first axis.

10. The device of claim 9, separate thrust plates mounted between each of said mating annular surfaces.

References Cited by the Examiner

UNITED STATES PATENTS

| | | | |
|---|---|---|---|
| 1,186,625 | 6/1916 | Van Dyke | 64—17 |
| 1,514,942 | 11/1924 | Whitten | 64—17 |
| 1,649,460 | 11/1927 | Funnell | 64—18 |
| 1,898,265 | 2/1933 | Ragan | 64—21 |
| 1,911,214 | 5/1933 | Van Ranst | 64—2 |
| 2,133,176 | 10/1938 | Parent | 64—17 |
| 2,271,974 | 2/1942 | Greiner | 64—18 |

FOREIGN PATENTS

| | | |
|---|---|---|
| 512,502 | 7/1952 | Belgium. |

FRED C. MATTERN, JR., *Primary Examiner.*

HALL C. COE, *Examiner.*